(12) United States Patent
Dobchuk

(10) Patent No.: US 11,237,532 B2
(45) Date of Patent: Feb. 1, 2022

(54) HYSTERESIS COMPENSATION CONTROL OF AN ACTUATOR

(71) Applicant: DEERE & COMPANY, Moline, IL (US)

(72) Inventor: Jeff Dobchuk, Saskatoon (CA)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/814,428

(22) Filed: Mar. 10, 2020

(65) Prior Publication Data

US 2021/0286332 A1 Sep. 16, 2021

(51) Int. Cl.
  *G05B 17/02* (2006.01)
  *F15B 19/00* (2006.01)
(52) U.S. Cl.
  CPC ............ *G05B 17/02* (2013.01); *F15B 19/007* (2013.01)
(58) Field of Classification Search
  CPC .............................. F15B 19/007; G05B 17/02
  See application file for complete search history.

(56) References Cited

U.S. PATENT DOCUMENTS

| | | | |
|---|---|---|---|
| 3,181,559 A | 5/1965 | Hipple et al. | |
| 4,577,143 A | 3/1986 | Eschrich et al. | |
| 5,422,556 A | 6/1995 | Graf et al. | |
| 6,571,757 B1 | 6/2003 | Simpson | |
| 6,729,283 B2 | 5/2004 | Simpson et al. | |
| 6,792,902 B2 | 9/2004 | Simpson | |
| 7,857,281 B2 | 12/2010 | Pfaff | |
| 2005/0240364 A1* | 10/2005 | Friman | G05B 19/00 702/66 |

(Continued)

FOREIGN PATENT DOCUMENTS

| | | | |
|---|---|---|---|
| DE | 19813913 A1 | 9/1999 | |
| DE | 102006011350 A1 * | 9/2007 | F16D 48/06 |

OTHER PUBLICATIONS

Ge, P. and Jouaneh, M., 1995. Modeling hysteresis in piezoceramic actuators. Precision engineering, 17(3), pp. 211-221. (Year: 1995).*

(Continued)

*Primary Examiner* — Rocio Del Mar Perez-Velez
*Assistant Examiner* — Alicia M. Choi
(74) *Attorney, Agent, or Firm* — Michael Best & Friedrich LLP

(57) ABSTRACT

A hysteresis compensation systems and methods. Hysteresis compensation is provided using a known response curve for each of a plurality of different state conditions. In response to determining that a state transition has occurred (i.e., from one response curve to another), the system generates a transition response curve extending from an origin point on a first response curve to an end point on a second response curve based at least in part on a known or determined difference between the input value of the origin point and the input value for the end point. In some embodiments, this difference is determined experimentally and, in others, it is estimated based on measured feedback. Hysteresis compensation is then provided by identifying an input value on the transition response curve that corresponds to a target system output value for the received indicated input value (e.g., as defined by a reference curve).

20 Claims, 8 Drawing Sheets

(56) References Cited

U.S. PATENT DOCUMENTS

2005/0256661 A1* 11/2005 Salsbury ............... F24F 11/30
　　　　　　　　　　　　　　　　　　　　702/113
2009/0222180 A1　　9/2009 Kraenzlein et al.
2011/0074888 A1* 3/2011 Fujii ................... H01L 41/042
　　　　　　　　　　　　　　　　　　　　347/68
2012/0046793 A1* 2/2012 Song ................ G05B 19/4142
　　　　　　　　　　　　　　　　　　　　700/282

OTHER PUBLICATIONS

Ahn, K.K. and Kha, N.B., 2007. Internal model control for shape memory alloy actuators using fuzzy based Preisach model. Sensors and Actuators A: Physical, 136(2), pp. 730-741. (Year: 2007).*
Majima, S., Kodama, K. and Hasegawa, T., 2001. Modeling of shape memory alloy actuator and tracking control system with the model. IEEE Transactions on Control Systems Technology, 9(1), pp. 54-59. (Year: 2001).*
Extended European Search Report and Written Opinion issued in European Patent Application No. 21159412.2, dated Jul. 30, 2021, in 14 pages.
Lining Sun et al: "Hysteresis compensation for piezoelectric actuator based on adaptive inverse control", Intelligent Control and Automation, 2004. WCICA 2004. Fifth World Congress on Hangzhou, Jun. 15, 2004 (Jun. 15, 2004), pp. 5036-5039, DOI: 10.1109/WCICA.2004.1343676.

* cited by examiner

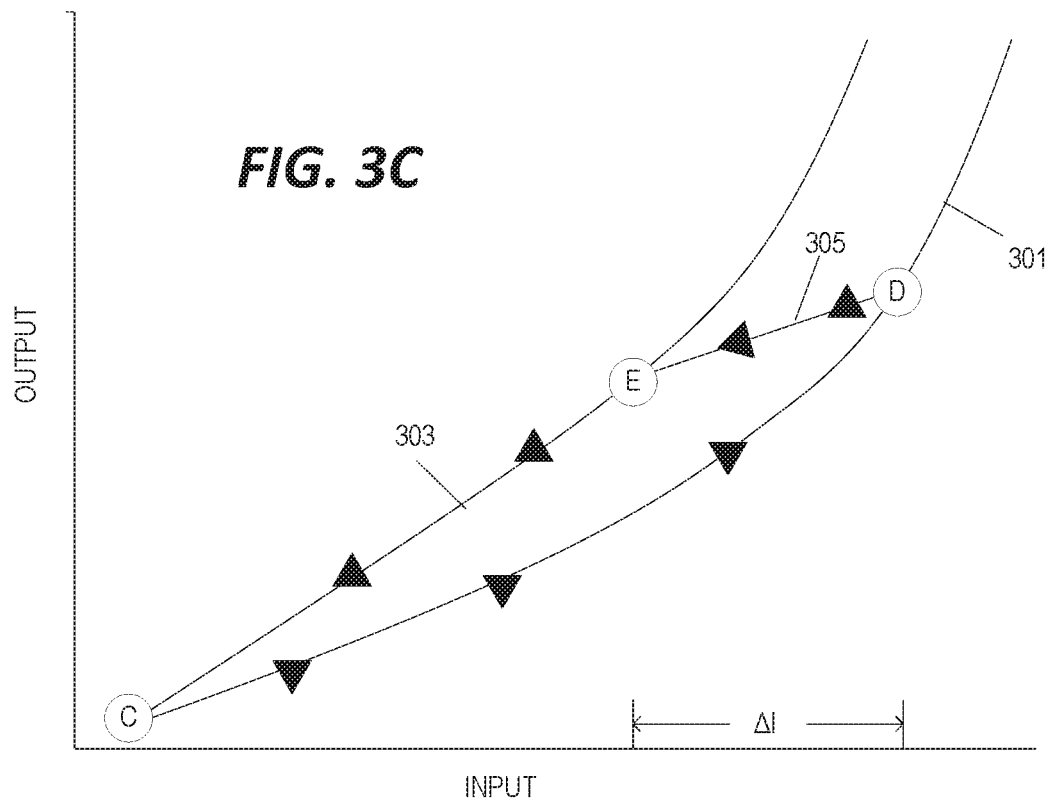
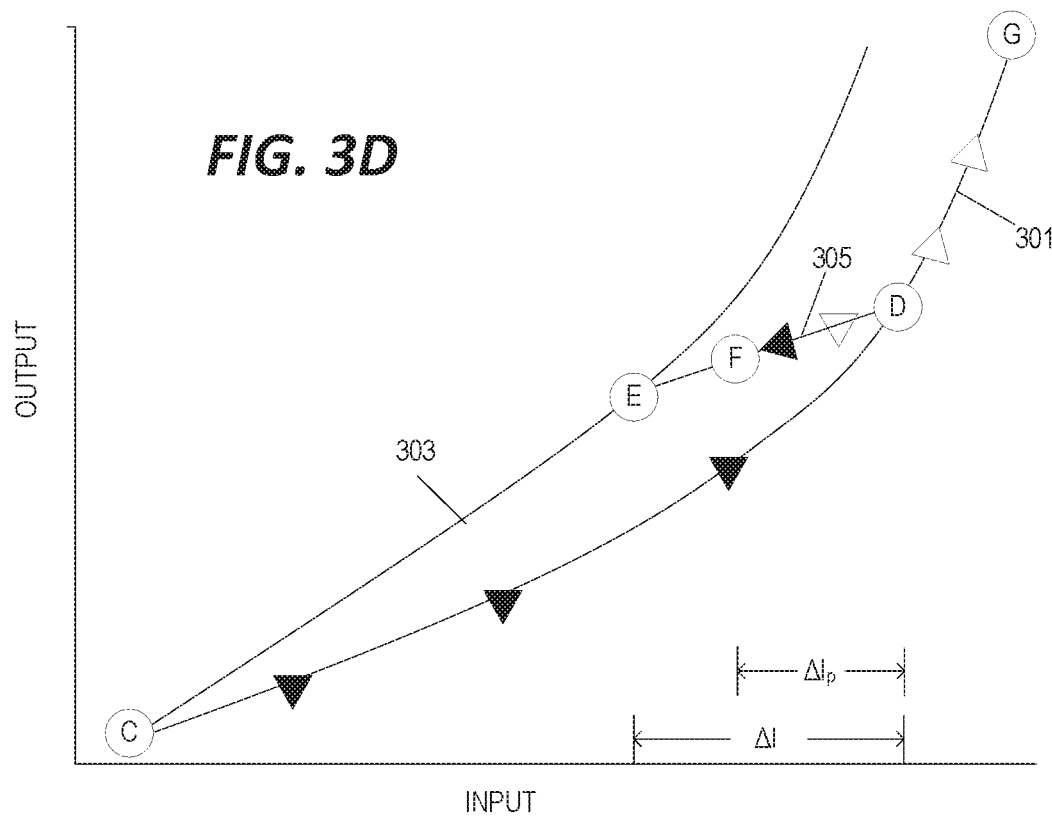

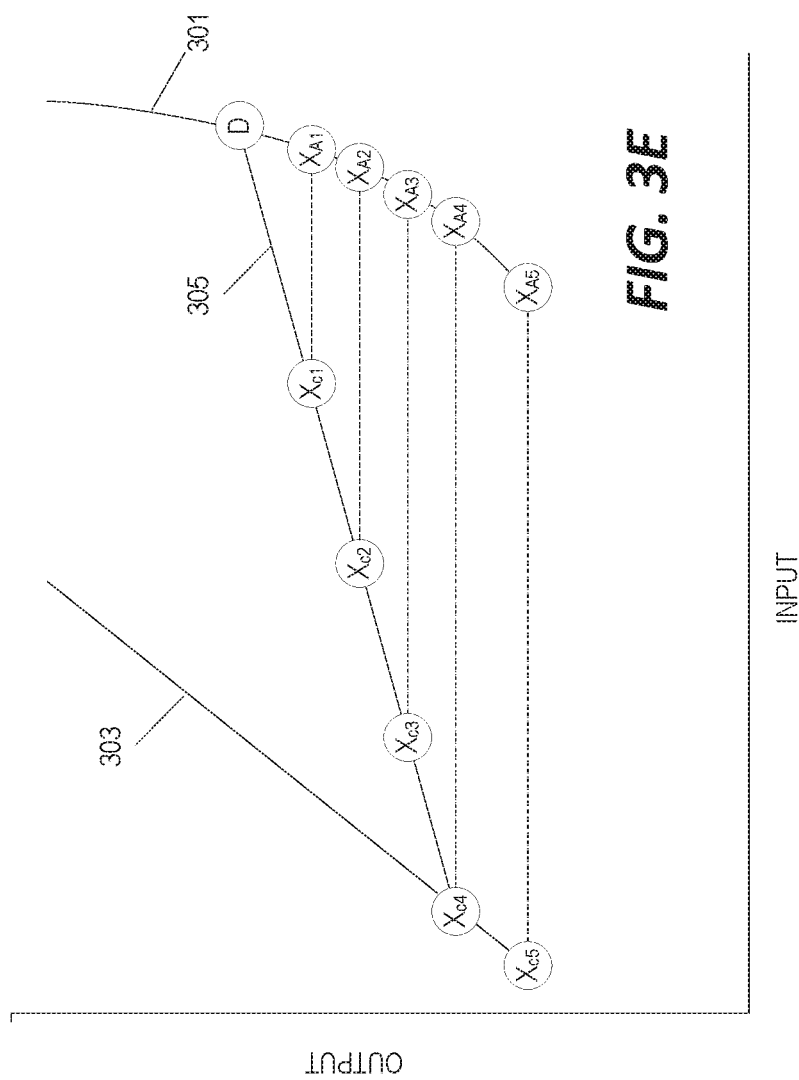

HYSTERESIS COMPENSATION CONTROL OF AN ACTUATOR

BACKGROUND

The present invention relates to methods and systems for controlling an actuator. For example, the methods and systems described herein can be adapted for use in controlling a hydraulic valve actuator.

SUMMARY

The systems and methods described herein adjust control commands (e.g., a current signal) to an actuator that behaves in a repeatable manner that exhibits hysteresis. This leads to more reliable, predictable, and repeatable component control. In some embodiments, the hysteresis compensation drives an electro-hydraulic servo valve (EH valve). The hysteresis can be caused by physical phenomena like (but not limited to): flow forces in the hydraulic portion of the valve, magnetic properties of a solenoid, and/or friction effects due to relative motion of component in an assembly.

In one embodiment, the invention provides a system comprising at least one actuator and a controller. The system output is controlled by applying a control input to the actuator. However, the value of the system output may vary depending on the value of the control input and a state condition of the system (e.g., whether the received sequence of inputs is rising or falling). A plurality of response curves, each corresponding to a different state condition of the system, each define an expected system output for each of a plurality of different input values. In response to determining that a state transition has occurred (i.e., from one response curve to another), the system generates a transition response curve extending from an origin point on a first response curve to an end point on a second response curve based at least in part on a known or determined difference between the input value of the origin point and the input value for the end point. In some embodiments, this difference is determined experimentally and, in others, it is estimated based on measured feedback. Hysteresis compensation is provided by identifying an input value on the applicable response curve or on the transition response curve that corresponds to a defined target system output value for the received indicated input value.

In some embodiments, the state transition includes receiving a decreasing input value after a sequence of increasing input values or receiving an increasing input value after a sequence of decreasing input values.

In some embodiments, the transition response curve is modeled by applying a first input value as the control value to the actuator and measuring an actual system output response. Based on the known applied first input value relative to the input value of the origin point of the transition response curve and the measured actual system output response relative to the target system output value defined by the reference curve for the applied first input value, the controller is able to estimate the difference between the input value of the origin point and the input value of the end point of the transition response curve.

Other aspects of the invention will become apparent by consideration of the detailed description and accompanying drawings.

BRIEF DESCRIPTION OF THE DRAWINGS

FIG. 3C is a graph illustrating an example of a transition response curve transitioning the hysteresis gap of FIG. 3A in response to a control input changing from a rising control input sequence to a falling control input sequence.

FIG. 3D is a graph illustrating an example of a response performance when the control input again changes from a falling control input sequence to a rising control input sequence before completely traversing the hysteresis gap in the example of FIG. 3C.

FIG. 3E is a graph illustrating a detailed example of multiple sequential hysteresis input compensations applied while transitioning the hysteresis gap in the example of FIG. 3C.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
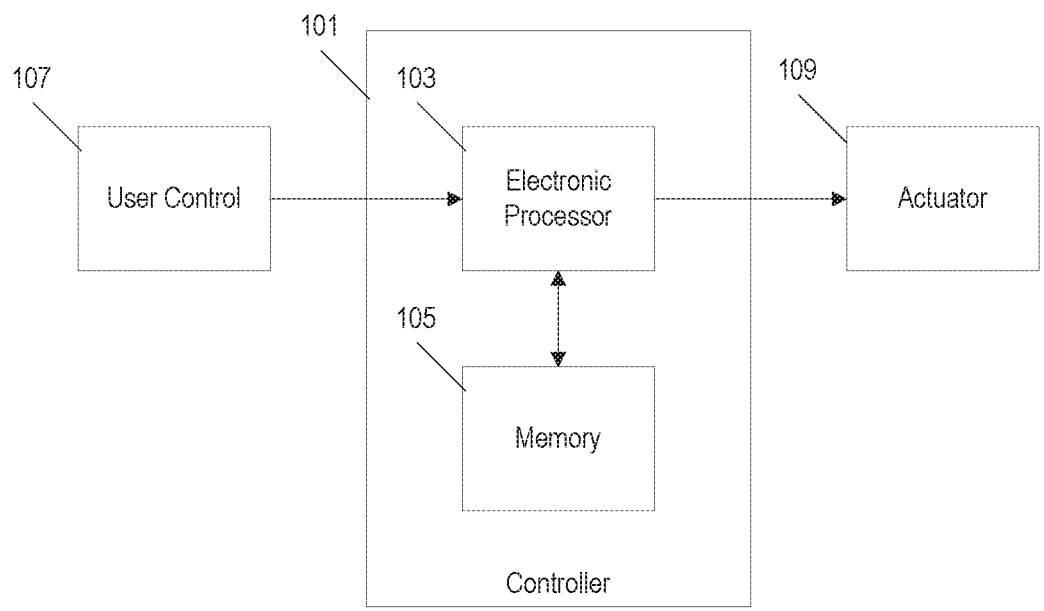
FIG. 1 is a block diagram of a first example of a control system for hysteresis compensation.

FIG. 1 illustrates a control system for an actuator in a system that exhibits hysteresis. A controller 101 includes an electronic processor 103 and a computer-readable non-transitory memory 105. The memory 105 stores data and instructions that are executed by the electronic processor 103 to provide functionality of the controller 101 such as described below. The controller 101 receives an input from a user control 107 (e.g., in the form of a voltage or current indicative of a relative position of a user manipulatable control) and provides an output to an actuator 109 to control the operation of the actuator. However, because the system exhibits some degree of hysteresis, an output provided to the actuator while the input is rising will result in a different behavior than if the same output were provided to the actuator while the input is falling. According, the controller 101 is configured to provide hysteresis compensation to help ensure that the actuator/system behave similarly for the same input on the user control 107 regardless of whether the input is rising or falling at any given moment.

Figure 2:
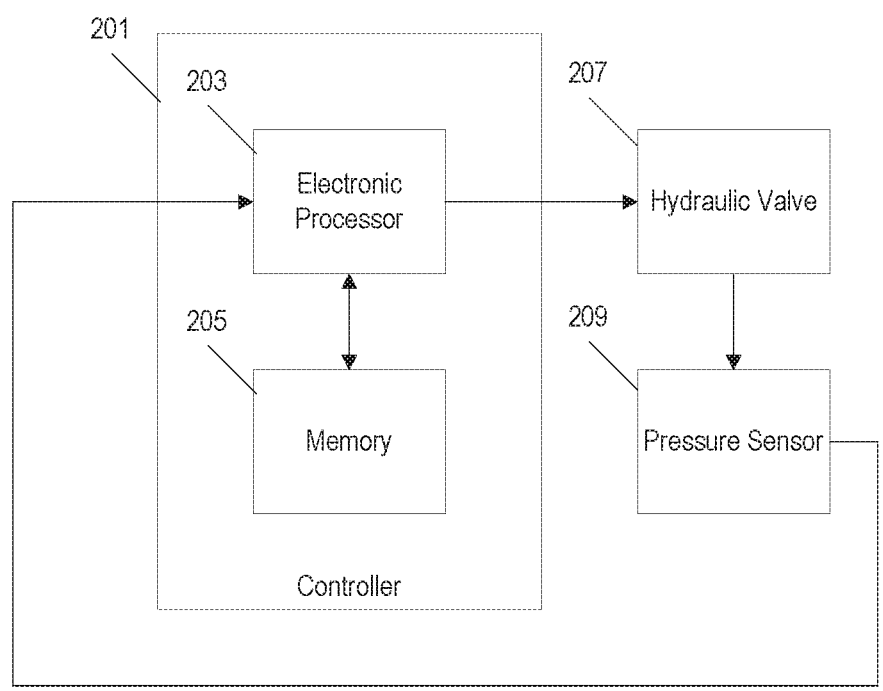
FIG. 2 is a block diagram of a second example of a control system for hysteresis compensation.

Although the example of FIG. 1 shows a control input received from a user control 107, in some implementations, the control input may be received by the electronic processor 103 as an electronic command from another controller or component indicative of a desired final state of the component output (e.g., pressure, velocity, etc.). Furthermore, in some implementations, instead of adjusting the actuator in response to a command input received from an external source, a controller may be configured to adjust the actuator as a feedback response in response to a signal indicative of a measured condition received from a sensor. FIG. 2 illustrates one such example of a feedback-based controller 201 that includes an electronic processor 203 and a computer-readable non-transitory memory 205. Again, the memory 205 stores data and instructions that, when executed by the electronic processor, provide the functionality of the controller 201. The controller 201 provides an output to a hydraulic valve 207 that controls the operation of the valve 207 (e.g., the degree to which the valve 207 is opened or closed). A pressure sensor 209 monitors hydraulic fluid pressure 209 and provides a feedback signal to the controller 201 that is, in turn, used by the controller to determine an appropriate "input" signal for controlling the hydraulic valve 207. However, like the system of FIG. 1, the system of FIG. 2 also exhibits some degree of hysteresis. Accordingly, the controller 201 is configured to provide hysteresis compensation to help ensure that the hydraulic valve behaves similarly for the same input, as determined by the feedback loop, regardless of whether the input is rising or falling at any given moment.

Many types of hysteresis are characterized by a non-linear function bounded by two response curves each indicative of a system response to a particular input under various conditions. Although the examples below describe hysteresis characterized by two response curve, these methods and system can be adapted and applied to situations in which hysteresis is characterized by a family of non-linear functions and/or by multiple-dimensional functions in which the output response of an actuator or a system to a particular input varies, not only based on whether the input sequence is increasing or decreasing, but also based on other variables such as, for example, temperature.

Figure 3A:
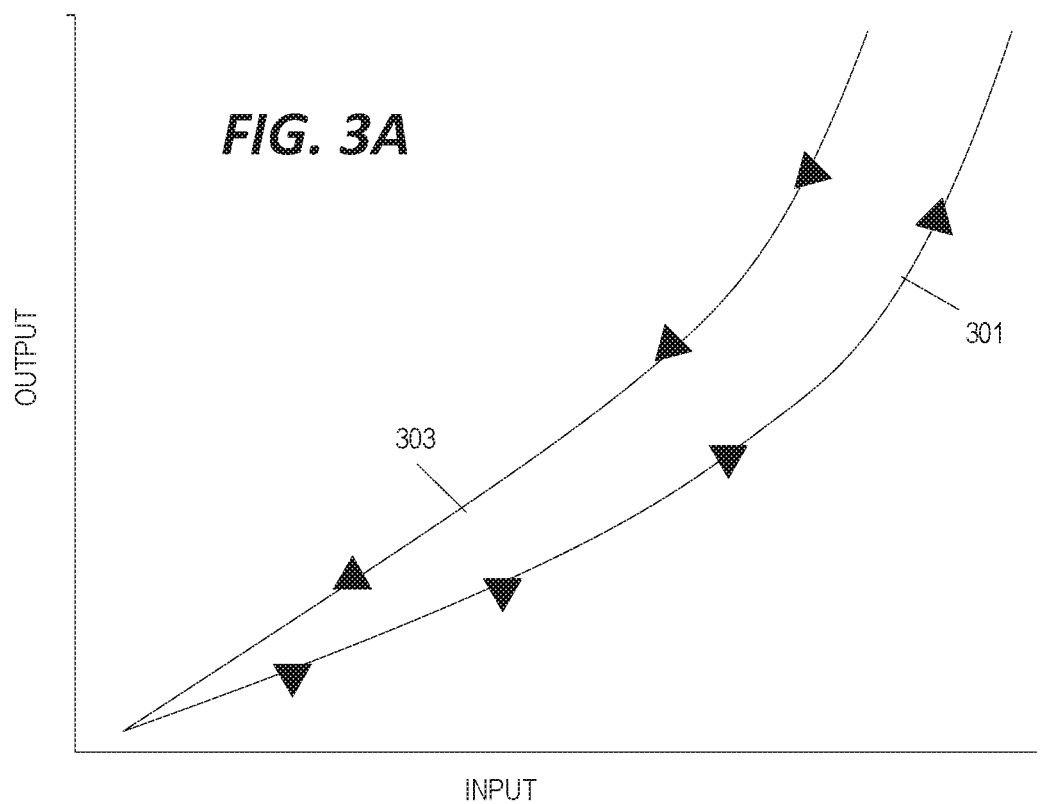
FIG. 3A is a graph of a rising response curve and a falling response curve illustrating a hysteresis gap.

FIG. 3A illustrates an example of a pair of response curves in a system that demonstrates hysteresis. A rising curve 301 defines an actuator performance (e.g., system "output") in response to a sequence of increasing command inputs. Conversely, the falling curve 303 defines the actuator performance (e.g., the system "output") in response to a sequence of decreasing command inputs. For example, in the case of a variable position hydraulic valve actuator, the "output" may be indicative of a position of the valve (e.g., a relative degree of valve closure) in response to a given voltage or current input signal provided to the valve actuator.

The spacing between the rising curve 301 and the falling curve 303 demonstrates a difference in system performance in response to a given input depending on whether the actuator is responding to an increasing sequence of input commands or a decreasing sequence of input commands. This difference is referred to herein as a hysteresis gap. Despite the two different response curves, the output is generally piecewise continuous and a true "function" in that the output is single valued for each unique input value depending on the previous state(s) of the input. Depending on the physical phenomena present in the system, which manifests as hysteresis, the rising curve 301 and the falling curve 303 are independent of each other.

Despite this hysteresis, a control system (e.g., the system of FIG. 1 or FIG. 2) can be configured to compensate an indicated control input to achieve consistent actuator response. For example, a "reference curve" may be defined that identifies an intended system output for each possible "indicated input" value (e.g., a command input as indicated by the user control, a feedback calculation, or by a command signal from another controller/system). Using the reference curve, the system is able to compensate for hysteresis by adjusting the value of the indicated input to a particular reference curve based on a current operating state of the system to achieve the performance output as indicated by the reference curve. Accordingly, indicated inputs can be determined and provided to the controller (e.g., from the user control or as an electronic command from another system) as though there was no hysteresis effect in the system operation.

Figure 3B:
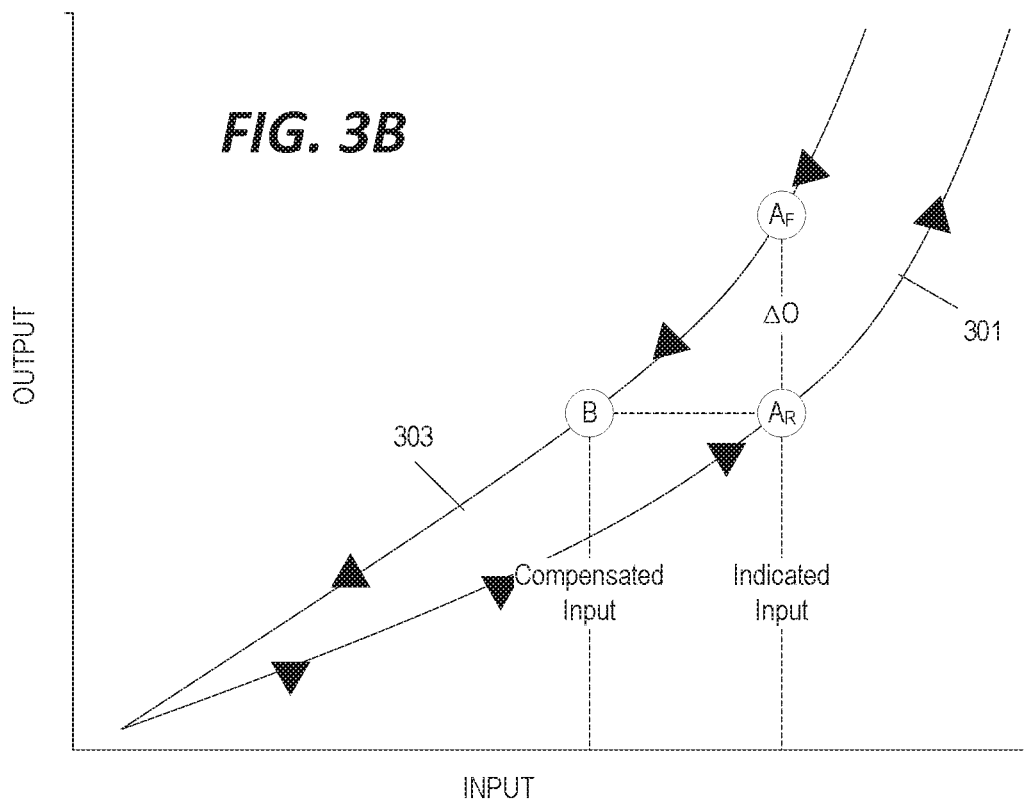
FIG. 3B is graph illustrating an example of hysteresis compensation for consistent response performance in a system exhibiting the rising and falling response curves of FIG. 3A using the rising response curve as a reference curve.

FIG. 3B illustrates an example of hysteresis compensation using the rising response curve 301 and the falling response curve 303. In this example, the rising response curve 301 is defined as the "reference curve." As discussed above, due to the hysteresis gap between the rising response curve 301 and the falling response curve 303, the same input provided to the actuator can result in different performance output ($\Delta O$) depending on whether the current sequence of inputs is increasing or decreasing. For example, the same indicated input can result in a lower output performance (indicated by "Point $A_R$" in FIG. 3B) when the input is a part of an increasing sequence of inputs and can result in a higher output performance (indicated by "Point $A_F$" in FIG. 3B) when the input is a part of a decreasing sequence of inputs. In order to provide the same actuator performance output for a given indicated input value, the controller is configured to adjust the indicated input value by a value equal to the hysteresis gap distance between the reference curve and the applicable response curve at a desired performance output.

In the specific example of FIG. 3B, because the rising response curve 301 is defined as the "reference curve," when the controller receives an indicated input corresponding to the input level of "Point $A_R$" as part of an increasing sequence of indicated input values, the controller provides that same input value to the controller without compensation and the output performance of the actuator matches the output of "Point $A_R$" as indicated on the rising response curve 301 (i.e., the reference curve). However, when the controller receives an indicated input value corresponding to the input value of "Point $A_R$" as part of a decreasing sequence of indicated input values, the controller determines a compensated input value on the falling response curve 303 (i.e., the input value corresponding to the same output value on the falling response curve as the output value defined by the reference curve for the indicated input value) and provides the compensated input value (indicated by "Point B" in FIG. 3B) as input to the actuator in order to achieve the same performance output corresponding to "Point $A_R$" on the reference curve.

In other words, when the applicable response curve for the state of the system does not match the reference curve, hysteresis compensation is achieved by (1) identifying a particular output value corresponding to an indicated input on the reference curve and (2) offsetting the indicated input by a value indicative of the hysteresis gap between the applicable response curve and the reference curve at the identified output value.

While FIG. 3A illustrates the separate rising response curve 301 and falling response curve 303 for a system, the system response is different when the increasing/decreasing direction of the sequence of inputs changes from increasing to decreasing (or vice versa). One example of a system response to a changing input direction is illustrated in FIG. 3C. In this example, the input value provided to the actuator begins at "Point C" and is followed by a sequence of increasing input values to the input value at "Point D." The sequence of input values then decreases to the original input value at "Point C."

As the input value increases from "Point C" to "Point D," the output response of the system follows the rising response curve 301. However, when the direction of the input changes from rising to falling, the system performance transitions across the hysteresis gap as defined by a transition response curve 305. At "Point E," the hysteresis gap has been fully traversed and the transition response curve 305 ends at a point on the falling response curve 303. Accordingly, while the input value decreases from the input value of "Point D" to the input value of "Point E," the output response of the system follows the transition response curve 305 and, as the input value continues to decrease from the input value of "Point E" to the input value of "Point C," the output response of the system follows the falling response curve 303.

In some systems (and/or under certain conditions), the system performance will follow the same transition response curve to cross the hysteresis gap when a decreasing sequence of input values (following falling response curve 303) changes to an increasing sequence of input values before input value before the system performance completely traverses the hysteresis gap. For example, in FIG. 3D, the input provided to the actuator begins at the input value of "Point C" followed by a sequence of increasing input values to the input value of "Point D." The input values then sequentially decrease from the input value of "Point D" to the input value of "Point F" before changing direction again and gradually increasing to the input value of "Point G." Like in the example of FIG. 3C, the output performance of the system follows the rising response curve 301 as the input value is increased from "Point C" to "Point D" and, then follows a transition response curve 305 as the input value decreases from "Point D" to "Point F." However, the hysteresis gap has not yet been fully traversed by the transition response curve 305 when the input direction again changes at "Point F." System performance again follows the transition response curve 305 as the input values increase from "Point F" back to "Point D" where the transition response curve 305 rejoins the rising response curve 301 and the system performance follows the rising response curve 301 as the sequence of input values continue to increase from the input of "Point D" to the input of "Point G."

When a transition response curve 305 is known (or modelled), the indicated input can be adjusted to compensate for hysteresis similar to as indicated above in reference to FIG. 3B. FIG. 3E provides a specific example in which the sequence of indicated input values increase to an input value corresponding to "Point D" followed by a sequence of decreasing input values corresponding to points $X_{A1}$, $X_{A2}$, $X_{A3}$, $X_{A4}$, and $X_{A5}$. The output value indicated by the reference curve 301 for each of the first three indicated input values after the change in direction (i.e., $X_{A1}$, $X_{A2}$, and $X_{A3}$) correspond to output levels on the transition response curve 305 (i.e., before the transition response curve 305 completely traverses the hysteresis gap and ends at the falling response curve 303). Accordingly, in response to receiving each of these first three indicated input values, the controller determines a compensated input value by identifying an input value on the transition response curve 305 that corresponds to the same output value as the output value defined by the reference curve 301 for the indicated input. The output levels indicated by the reference curve 301 for each of the last two indicated input values (i.e., $X_{A4}$ and $X_{A5}$) correspond to output levels on the falling response curve 303 after the transition response curve 305 has rejoined the falling response curve 303. Accordingly, in response to receive each of these last two indicated input values, the controller determines a compensated input value by identifying an input value on the falling response curve 303 that corresponds to the same output value as the output value defined by the reference curve 301 for the indicated input.

In some implementations, the transition response curve 305 can be modeled based on the proportion of the hysteresis gap that is traversed by the output for a given input relative to a proportion of the hysteresis gap that is traversed by that input. Examples of modelling the transition response curve 305 based on this relationship can be explained in reference to the following equation:

$$\frac{\Delta O_p}{\Delta O} = \frac{\Delta I_p}{\Delta I} \quad (1)$$

where $\Delta I$ is the difference between the input value at the origin of the transition response curve 305 and the input value at the end of the transition response curve; where $\Delta I_p$ is the difference between a particular input value I and the input value at the origin of the transition response curve 305; where $\Delta O$ is the difference between the output defined by the rising response curve 301 and the output defined by the falling response curve 303 for the particular input value I; and where $\Delta O_p$ is the difference between the output on the transition response curve for the particular input value I and the output defined by the rising response curve 301 for the particular input value I.

Figure 3F:
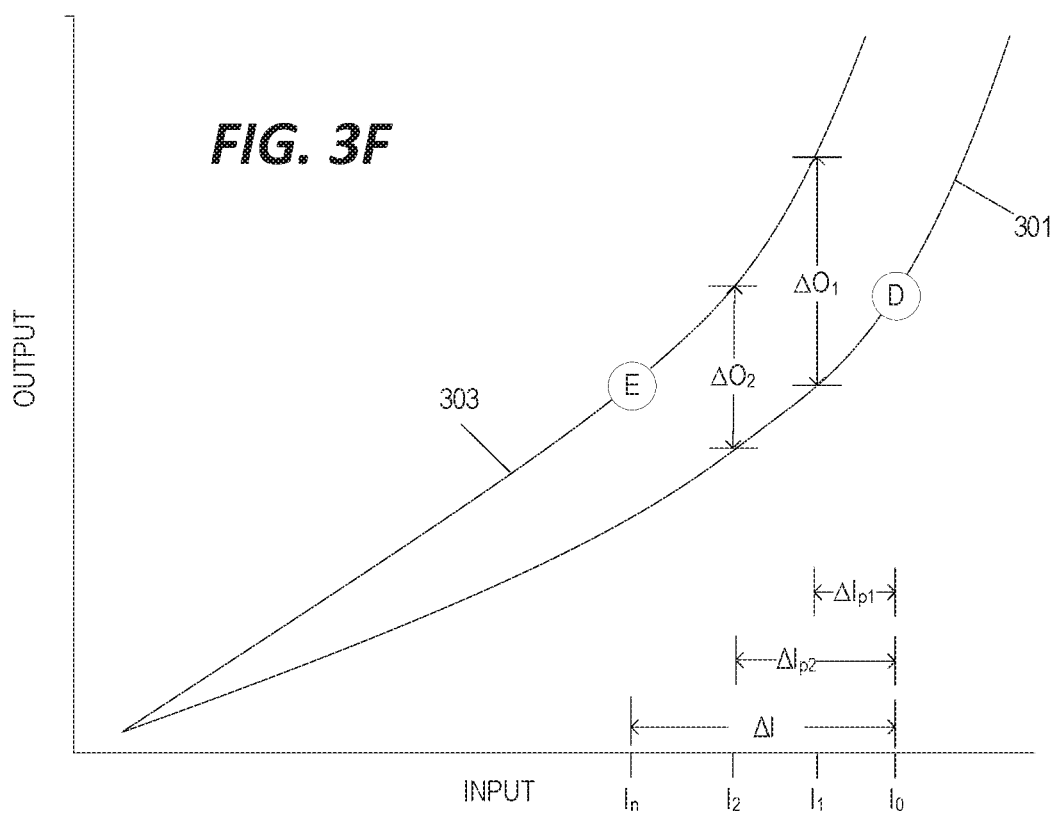
FIG. 3F is a graph illustrating a mechanism for determining various variables in the process of modelling a transition response curve.
Figure 3G:
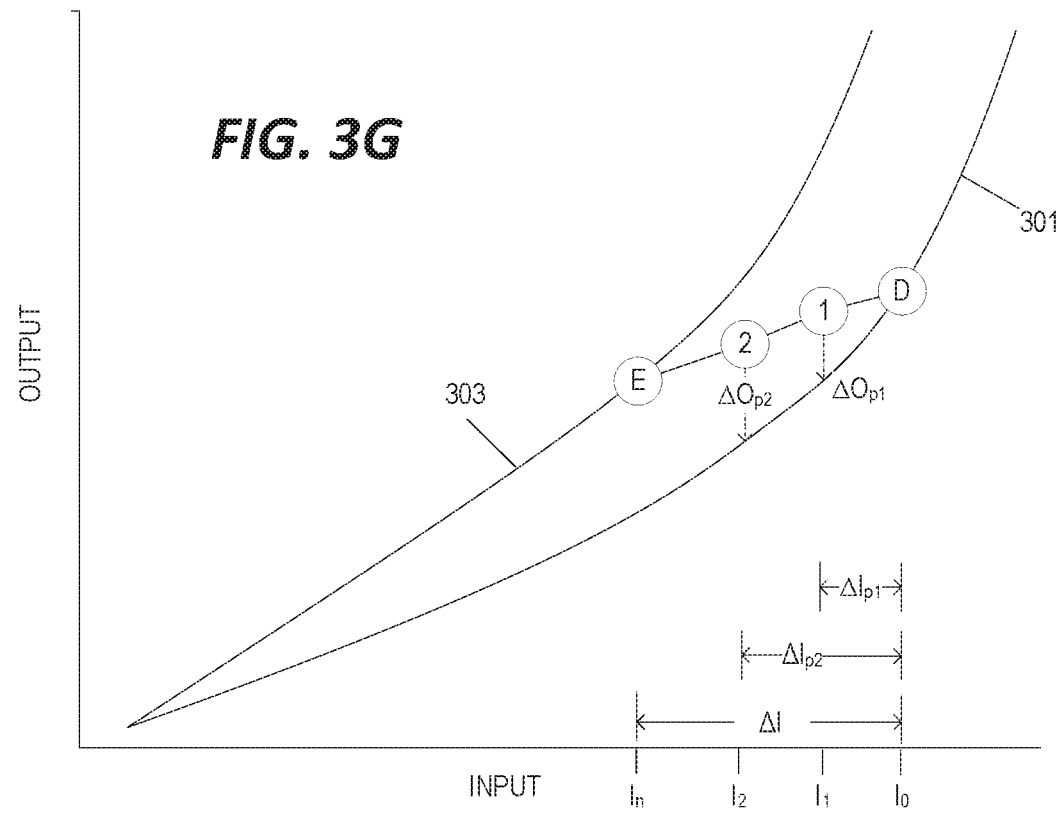
FIG. 3G is a graph illustrating a mechanism for modelling a transition response curve by plotting representative points on the transition response curve using variables determined in the example of FIG. 3F.

FIGS. 3F and 3G provides a specific example of modelling the transition response curve 305 based on the relationship defined by equation (1) above where the input value at the origin of the transition response curve 305 (i.e., "Point D") and $\Delta I$ (i.e., the difference between the input value at the origin of the transition response curve ("Point D") and the input value at the end of the transition response curve ("Point E")) are both known. In this example, $I_0$ is the input value at which the sequence of inputs changes from an increasing sequence to a decreasing sequence. Because $I_0$ is known (from the actual received inputs), the output value corresponding to that input (i.e., "Point D") can be determined from the known rising response curve 301. Also, because $\Delta I$ for the given origin point of the transition response curve 305 (i.e., "Point D") is known, the input value $I_n$ at the end of the transition curve 305 can also be determined and, in turn, the output value corresponding to that determined input at the end of the transition response curve (i.e., "Point E") can also be determined from the known falling response curve 303.

Given this known and determinable information, the transition response curve 305 can be modelled by applying the relationship defined by equation (1) for one or more input points between $I_0$ and $I_n$. FIGS. 3F and 3F shows this process for two such input values $I_1$ and $I_2$. As shown in FIG. 3F, the difference $\Delta I_{p1}$ between the first modelled input value $I_1$ and the origin input $I_0$ of the transition response curve 305 is calculated and the width of the hysteresis gap $\Delta O_1$ for the first modelled input value $I_1$ can be calculated as a difference between the output defined by the known falling response curve 303 and the known rising response curve 301 for the first modelled input $I_1$. An estimated output on the transition response curve 305 for the first modelled input $I_1$ can then be determined relative to the output on the rising response curve 301, as shown in FIG. 3G as "Point 1," by the following equation:

$$\Delta O_{p1} = \frac{\Delta I_{p1}}{\Delta I} \times \Delta O_1 \quad (2)$$

The same process can be used to determine an estimated output on the transition response curve for the second modelled input $I_2$, as shown in FIG. 3G as "Point 2," using the similar equation:

$$\Delta O_{p2} = \frac{\Delta I_{p2}}{\Delta I} \times \Delta O_2 \quad (3)$$

The rest of the transition response curve 305 can be modeled by calculating output values corresponding to additional input values between the origin input $I_0$ and the end input $I_n$ of the transition response curve. Alternatively or additionally, the transition response curve 305 can be modelled by determining a "best fit" curve based on the determined outputs for the known & modelled points on the transition response curve 305.

Figure 4:
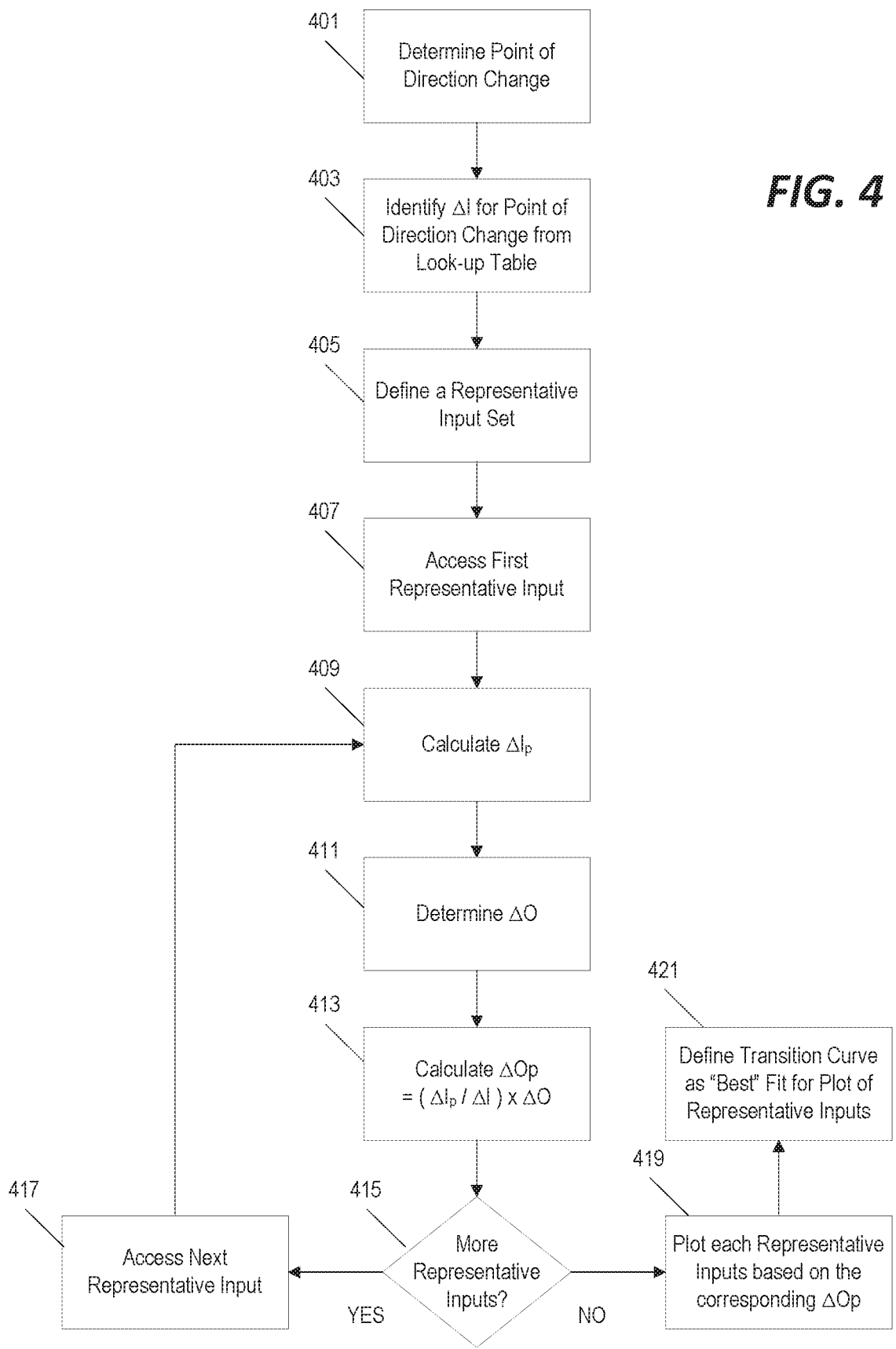
FIG. 4 is a flowchart of a method for modelling a transition response curve based on a known origin point of the transition response curve and a known difference between the input at the origin point of the transition response curve and an input at the end of the transition response curve.

FIG. 4 illustrates an example of a method for modelling a transition response curve 305 according to the example of FIGS. 3F and 3G. For a particular point of direction change of the input sequence (step 401) (i.e., an origin point $I_0$ of the transition response curve), a look-up table is used to identify a $\Delta I$ for the transition response curve 305 (step 403). Although a look-up table is used in the example of FIG. 4, in other implementations, alternative mechanisms for determining $\Delta I$ may be utilized including, for example, a calculation of $\Delta I$ as a function of one or more system variables. A representative set of input points along the transition response curve 305 is defined (step 405), for example, by selecting a defined number of evenly spaced input points between $I_0$ and $I_n$. For a first representative input point of the set of representative input values (step 407), the controller calculates $\Delta I_p$ (step 409) and determined $\Delta O$ for the first representative input point from the known rising response curve 301 and the known falling response curve 303 (step 411). Based on this known and determined information, the controller then calculates $\Delta O_p$ for the first representative input point (step 413). A next representative input point in the set of representative input values is selected (step 417) and the process for calculating $\Delta O_p$ is repeated for the second representative input value and for each other representative input value in the set of representative input values.

When output values on the transition response curve 305 have been calculated for each representative input value in the set of representative input values (step 415), an initial model of the transition response curve is plotted by defining an estimated output for each representative input in the set of representative inputs (based on the calculated $\Delta O_p$ for each representative input) (step 419). The final transition response curve 305 is then modelled by using a "best fit" algorithm to determine a best-fit curve corresponding to the modelled points of the transition response curve from the set of representative inputs (step 421).

In some implementations, the method of FIG. 4 may be applied in real-time to determine a transition response curve in response to detecting a change in direction of the sequence of inputs. In other implementations, the method of FIG. 4 may be applied during manufacturer testing and calibration in order to define/model a plurality of transition response curves for each of a plurality of possible transition response curve origin points. These pre-modelled transition response curves are then stored to memory and accessed in response to detecting the change in direction of the sequence of inputs.

Figure 5:
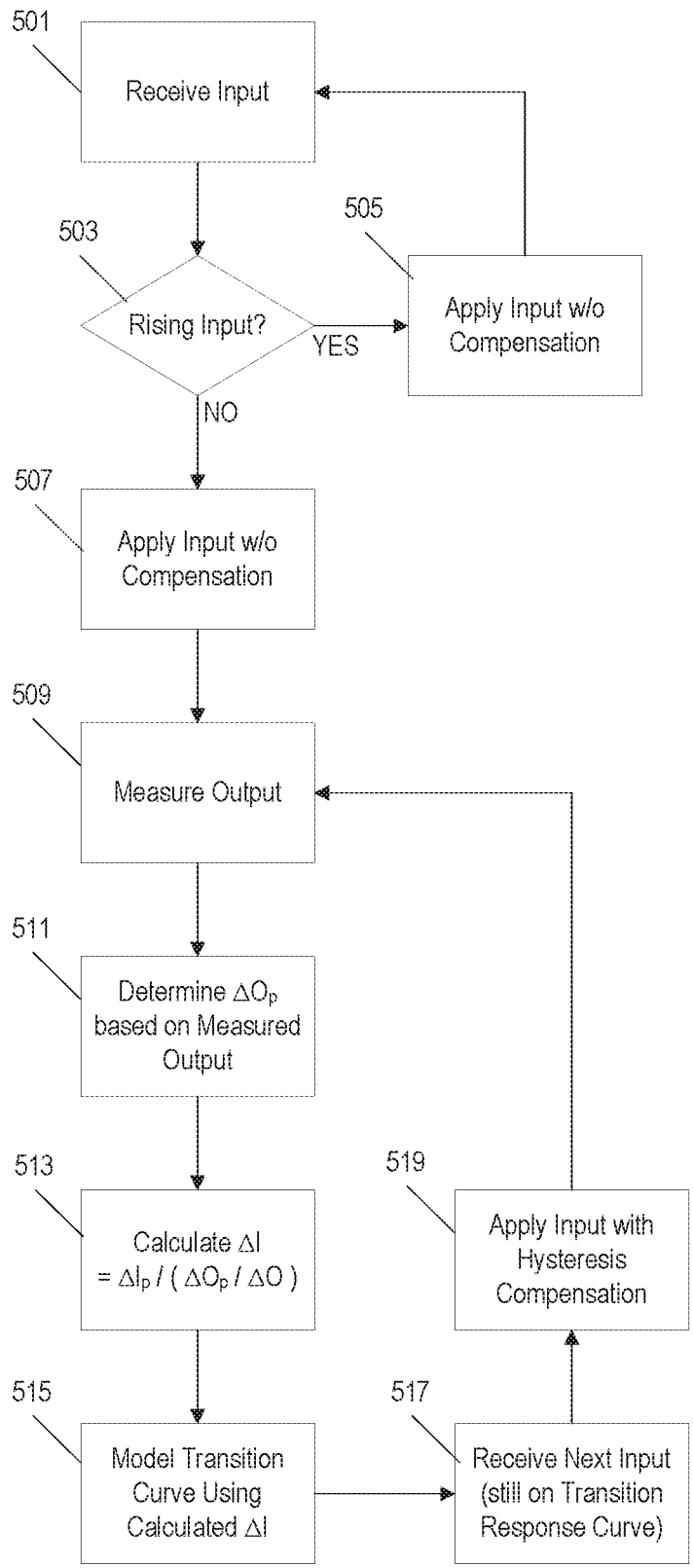
FIG. 5 is a flowchart of a method for modelling a transition response curve based on a measured output of an actuator as feedback.

Although the example described above with respect to FIGS. 3F and 3G use a known $\Delta I$ for a particular origin input $I_0$ of a transition response curve 305, other mechanisms for modelling the transition response curve 305 are possible based on the relationship of equation (1). For example, a feedback method can be implemented by an electronic controller to model a transition response curve for use in hysteresis compensation in real-time. FIG. 5 illustrates one example of such a feedback-based system for modelling the transition response curve based on the relationship defined by equation (1).

The example of FIG. 5 begins as the controller is receiving an increasing sequence of input values (step 501) and using the rising response curve 301 as the reference curve for hysteresis compensation. As the received values continue to increase (step 503), the controller applies the input to the actuator without compensation (step 505). In response to receiving a first input value indicative a change in direction of the sequence of input values (i.e., an input value that is lower than the previous received input value), the controller again applies the input without compensation (step 507) and then measures the output produced by the actuator in response to the applied falling input value (step 509). Based on the measured output value, the controller then calculates a $\Delta O_p$ for the applied input value based on a difference between the measured output and the output indicated by the rising response curve 301 for the applied input value (step 511). The controller is also able to determine $\Delta O$ for the applied input value based on a different between the output defined by the known falling response curve for the applied input value and the output defined by the known rising response curve for the applied input value. Based on these known and determined values, the controller then calculates an estimated value of $\Delta I$ (i.e., the difference between the input value at the origin of the transition response curve and the input value at the end of the transition response curve) (step 513) using the following equation:

$$\Delta I = \frac{\Delta I_p}{\left(\frac{\Delta O_p}{\Delta O}\right)} \quad (4)$$

With an estimated value of $\Delta I$, the controller then proceeds to model an estimated transition response curve, for example, using the method of FIG. 4 (step 515). When a next input value is received that is still within the range corresponding to the transition response curve (step 517), the controller determines and applies an appropriate hysteresis compensation for the received input based on the modelled transition response curve (step 519).

In some implementations, the controller is configured to further refine and adjust the estimated transition response curve as additional compensated inputs are applied to the actuator. As each subsequent input on the same transition response curve is applied to the actuator, the controller measures a corresponding output (step 509) and calculates a $\Delta O_p$ for the subsequent applied input value (step 511). In some such implementations, the $\Delta I$ is recalculated for each subsequently applied input value (step 513) and the $\Delta I$ used to adjust/model the transition response curve is updated as an average of the $\Delta I$ values determined from each applied input. Additionally or alternatively, the transition response curve is remodeled (at step 515) using, for example, a "best fit" curve based on the data points for all applied input values on the transition curve and their corresponding measured output.

Figure 6:
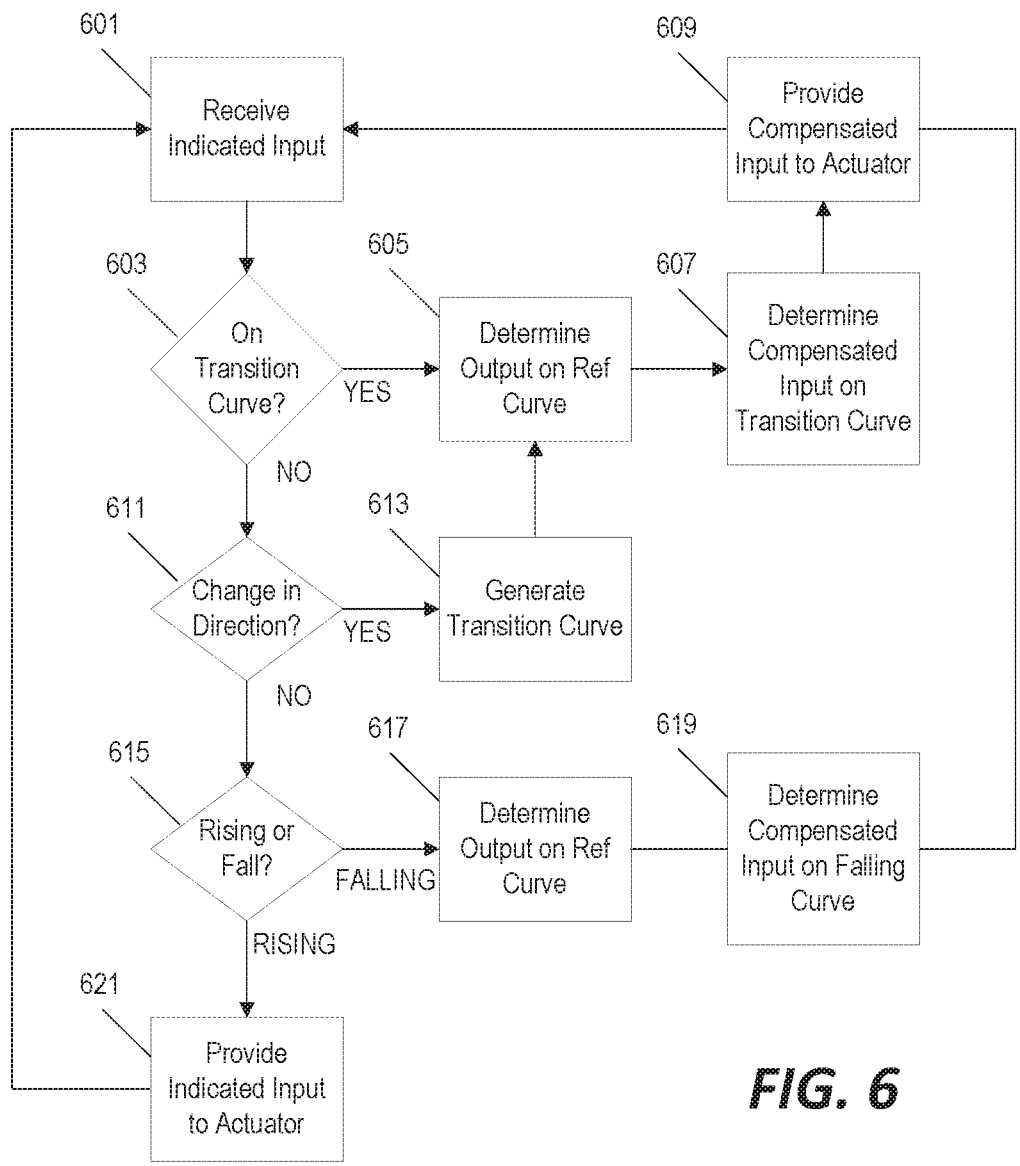
FIG. 6 is a flowchart of a method for applying hysteresis compensation to account for hysteresis gap transitions.

To summarize the examples presented above, FIG. 6 illustrates one example of a method for controlling an actuator that exhibits hysteresis by using a hysteresis compensation mechanism as described above. In response to receiving an indicated input value (step 601), the controller determines whether the compensation mechanism is already operating according to a defined transition curve (step 603). If so, the controller determines an output on the reference curve corresponding to the indicated input value (step 605) and determines a compensated input value corresponding to the same output on the transition response curve (step 607). The compensated input value is then applied as the input to the actuator (step 609).

If the hysteresis compensation is not already operating according to a defined transition curve when the new indicated input value is received (step 603), then the controller determines whether the newly received indicated input value indicates a change in the increasing/decreasing direction of the sequence of inputs (step 611). If a change in direction is detected, then a new transition response curve is determined or modelled (e.g., as described above in reference to FIGS. 4 and 5) (step 613), an output corresponding to the indicated input is determined on the reference curve (step 605), and a compensated input value is determined as the input value defined by the new generated transition curve for the same output (step 607). The compensated input value is then applied as the input to the actuator (step 609).

If the hysteresis compensation is not already operating according to a defined transition curve (step 603) and no change in the increasing/decreasing direction of the sequence of inputs is detected (step 611), then the controller determines whether the newly received input value indicates a continuation of an increasing sequence of inputs or a decreasing sequence of inputs (step 615). If the new indicated input value is part of a decreasing sequence of inputs, then the controller determines an output corresponding to the indicated input value on the reference curve (step 617) and then identifies an input value on the falling response curve that corresponds to the same output value (step 619). That identified input value from the falling response curve is then applied to the actuator as the compensated input (step 609). However, if the newly received indicated input value is part of an increasing sequence of inputs and the controller is configured to use the rising response curve as the reference curve or hysteresis control compensation, then the indicated input value is provided as the input to the actuator without any compensation or adjustment (step 621).

Although the examples described above primarily focus on situations in which a transition response curve 305 originates from the rising response curve 301 in response to a decreasing input value being received after a sequence of increasing input values. However, the same methods and system described above can be adapted and applied to estimate (and then use for hysteresis compensation) transition response curves 305 that originate from a falling response curve 303 in response to an increasing input value being received after a sequence of decreasing input values.

Similarly, although the examples above discuss hysteresis compensation where the rising response curve 301 is used as the reference curve for hysteresis compensation, in some implementations, the methods and system described above may be adapted to utilize a falling response curve as the reference curve for hysteresis compensation. In still other implementations, the reference curve used for hysteresis compensation is neither the rising response curve, nor the falling response curve. In such implementations, hysteresis compensation is applied to both rising sequences of input values and falling sequences of input values in order to produce output values for each received input corresponding to the define reference curve. In some such implementations, the reference curve may be defined as a linear curve (e.g., a straight line) or may be defined as an average of the rising response curve and the falling response curve.

Finally, in the examples described above, the output generated for a given input on a transition response curve generally follows the transition response curve regardless of whether the subsequently received values follow the same increasing/decreasing direction of the previously received values along the transition response curve. However, this is not always the case. For example, in some systems, the reverse path along the same transition response curve only applies in conditions of constant temperature. Accordingly, in some implementations, in response to a change in the increasing/decreasing direction of an input value received while traversing the hysteresis gap on a transition response curve, the controller may be configured to model a new transition response curve extending from the previous transition response curve back to either the rising response curve or the falling response curve.

Thus, the invention provides, among other things, a system for controlling one or more actuators in a system by compensating a command input to account for hysteresis and by accounting for changes in input command direction by augmenting the compensation mechanism as the input command traverses the hysteresis gap. Various features and advantages of the invention are set forth in the attached drawings.

What is claimed is:
1. A system comprising:
   at least one actuator; and
   a controller configured to
   define a plurality of response curves, each response curve indicating a system output value expected to be generated for the system in response to providing each of a plurality of input values to the at least one actuator under a different one of a plurality of state conditions,
   define a reference curve indicating a target system output value corresponding to each of the plurality of input values regardless of the state condition,
   receive an indicated input value,
   identify the target system output value corresponding to the indicated input value on the reference curve,
   determine whether a state transition has occurred when the indicated input value is received,
   determine a compensated input value in response to determining that no state transition has occurred by identifying an input value on a first response curve corresponding to a system output value equal to the identified target system output value, wherein the first response curve is a response curve of the plurality of response curves corresponding to a current state condition, and defining the compensated input value based on a difference between the indicated input value and the identified input value on the first response curve, generate a transition response curve in response to determining that a state transition has occurred, wherein the transition response curve extends from an origin point on the first response curve to an end point on a second response curve, wherein the first response curve corresponds to a state condition before the detected state transition and the second response curve corresponds to a state condition after the detected state transition, and wherein the controller is configured to generate the transition response curve based on a transition response curve length, wherein the transition response curve length indicates a difference between an input value at the origin point of the transition response curve and an input value at the end point of the transition response curve, determine the compensated input value in response to determining that the state transition has occurred by identifying an input value on the transition response curve corresponding to the system output value equal to the identified target system output value, and defining the compensated input value based on a difference between the indicated input value and the identified input value on the transition response curve, and control an operation of the at least one actuator by transmitting the determined compensated input value as a control input to the at least one actuator.

2. The system of claim 1, wherein the controller is configured to generate the transition response curve by accessing a look-up table defining, for each of a plurality of input values, a value corresponding to the transition response curve length, and modelling the transition response curve based on the transition response curve length accessed from the look-up table for a previous indicated input value received before the state transition.

3. The system of claim 1, wherein the controller is configured to generate the transition response curve by generating the transition response curve defined by:

$$\frac{\Delta O_p}{\Delta O} = \frac{\Delta I_p}{\Delta I}$$

wherein, for each input value of a plurality of input values between the input value of the origin point of the transition response curve and the input value of the end point of the transition response curve, $\Delta O_p$ indicates a difference between an output value on the transition response curve and an output value on the first response curve for the input value on the transition response curve, $\Delta O$ indicates a difference between an output value on the second response curve and the output value on the first response curve for the input value on the transition response curve, $\Delta I_p$ indicates a difference between the input value on the transition response curve and the input value of the origin point of the transition response curve, and $\Delta I$ indicates the difference between the input value at the original point of the transition response curve and the input value at the end point of the transition response curve.

4. The system of claim 3, wherein the control is configured to generate the transition response curve by applying a first input value as input to the at least one actuator, measuring an actual system output value generated in response to applying the first input value as input to the at least one actuator, calculating the difference $\Delta O_p$ between the measured actual system output value and the output value on the first response curve for the applied first input value, calculating the difference $\Delta O$ between the output value on the second response curve for the applied first input value and the output value on the first response curve for the applied first input value, calculating the difference $\Delta I_p$ between the applied first input value and the input value at the origin point of the transition response curve, estimating the transition response curve length $\Delta I$ based on the calculated difference $\Delta O_p$, the calculated difference $\Delta O$, and the calculated difference $\Delta I_p$ for the applied first input value and the measured actual system output value, and modelling the transition response curve based on the estimated transition response curve length.

5. The system of claim 1, wherein the first response curve is a rising response curve and the state condition corresponding to the rising response curve is the system receiving an increasing sequence of indicated input values, wherein the second response curve is a falling response curve and the state condition corresponding to the falling response curve is the system receiving a decreasing sequence of indicated input values, and wherein the controller is configured to determine whether the state transition has occurred when the indicated input value is received by determining that, while receiving a sequence of indicated inputs each with successively increasing values, the indicated input value is less than the previous indicated input value in the sequence of indicated inputs values.

6. The system of claim 1, wherein the first response curve is a falling response curve and the state condition corresponding to the falling response curve is the system receiving a decreasing sequence of indicated input values, wherein the second response curve is a rising response curve and the state condition corresponding to the rising response curve is the system receiving an increasing sequence of indicated input values, and wherein the controller is configured to determine whether the state transition has occurred when the indicated input value is received by determining that, while receiving a sequence of indicated inputs each with successively decreasing values, the indicated input value is greater than the previous indicated input value in the sequence of indicated inputs values.

7. The system of claim 1, wherein the controller is further configured to:

determine whether a previously generated transition response curve was used to determine the compensated input value for a most recent previous indicated input value, and determine the compensated input value in response to determining that the previously generated transition response curve was used to determine the compensated input value for the most recent previous indicated input value by using the transition response curve to determine the compensated input value when the indicated input value is within a range of input values between the origin point and the end point of the transition response curve, and using the second response curve to determine the compensated input value when the indicated input value is beyond the end point of the transition response curve.

8. The system of claim 7, wherein the controller is configured to determine the compensated input value in response to determining that the previously generated transition response curve was used to determine the compensated input value for the most recent previous indicated input value by further using the transition response curve to determine the compensated input value when the indicated input value is within the range of input values between the origin point and the end point of the transition response curve regardless of whether the state transition is detected while using the transition response curve, and using the first response curve to determine the compensated input value when the indicated input value is beyond the origin point of the transition response curve.

9. The system of claim 1, wherein the controller is configured to define the reference curve by defining the first response curve or the second response curve as the reference curve.

10. A method of hysteresis compensation for a system including at least one actuator configured to receive a control input, the method comprising:

defining a plurality of response curves, each response curve indicating a system output value expected to be generated for the system in response to providing each of a plurality of input values to the at least one actuator under a different one of a plurality of state conditions, defining a reference curve indicating a target system output value corresponding to each of the plurality of input values regardless of the state condition, receiving an indicated input value, identifying the target system output value corresponding to the indicated input value on the reference curve, determining whether a state transition has occurred when the indicated input value is received, determining a compensated input value in response to determining that no state transition has occurred by identifying an input value on a first response curve corresponding to a system output value equal to the identified target system output value, wherein the first response curve is a response curve of the plurality of response curves corresponding to a current state condition, and defining the compensated input value based on a difference between the indicated input value and the identified input value on the first response curve, generating a transition response curve in response to determining that a state transition has occurred, wherein the transition response curve extends from an origin point on the first response curve to an end point on a second response curve, wherein the first response curve corresponds to a state condition before the detected state transition and the second response curve corresponds to a state condition after the detected state transition, and wherein the transition response curve is generated based on a transition response curve length indicating a difference between an input value at the origin point of the transition response curve and an input value at the end point of the transition response curve, determining the compensated input value in response to determining that the state transition has occurred by identifying an input value on the transition response curve corresponding to the system output value equal to the identified target system output value, and defining the compensated input value based on a difference between the indicated input value and the identified input value on the transition response curve, and controlling an operation of the at least one actuator by transmitting the determined compensated input value as a control input to the at least one actuator.

11. The method of claim 10, wherein generating the transition response curve includes accessing a look-up table defining, for each of a plurality of input values, a value corresponding to the transition response curve length, and modelling the transition response curve based on the transition response curve length accessed from the look-up table for a previous indicated input value received before the state transition.

12. The method of claim 10, wherein generating the transition response curve includes generating the transition response curve based on a relationship defined by:

$$\frac{\Delta O_p}{\Delta O} = \frac{\Delta I_p}{\Delta I}$$

wherein, for each input value of a plurality of input values between the input value of the origin point of the transition response curve and the input value of the end point of the transition response curve, $\Delta O_p$ indicates a difference between an output value on the transition response curve and an output value on the first response curve for the input value on the transition response curve, $\Delta O$ indicates a difference between an output value on the second response curve and the output value on the first response curve for the input value on the transition response curve, $\Delta I_p$ indicates a difference between the input value on the transition response curve and the input value of the origin point of the transition response curve, and $\Delta I$ indicates the difference between the input value at the original point of the transition response curve and the input value at the end point of the transition response curve.

13. The method of claim 12, wherein generating the transition response curve further includes applying a first input value as input to the at least one actuator, measuring the actual system output value generated in response to applying the first input value as input to the at least one actuator, calculating the difference $\Delta O_p$ between the measured actual system output value and the output value on the first response curve for the applied first input value, calculating the difference $\Delta O$ between the output value on the second response curve for the applied first input value and the output value on the first response curve for the applied first input value, calculating the difference $\Delta I_p$ between the applied first input value and the input value at the origin point of the transition response curve, estimating the transition response curve length ΔI based on the calculated difference $\Delta O_p$, the calculated difference ΔO, and the calculated difference $\Delta I_p$ for the applied first input value and the measured actual system output value, and modelling the transition response curve based on the estimated transition response curve length.

14. The method of claim 10, wherein the first response curve is a rising response curve and the state condition corresponding to the rising response curve is the system receiving an increasing sequence of indicated input values, wherein the second response curve is a falling response curve and the state condition corresponding to the falling response curve is the system receiving a decreasing sequence of indicated input values, and wherein determining whether the state transition has occurred when the indicated input value is received includes determining that, while receiving a sequence of indicated inputs each with successively increasing values, the indicated input value is less than the previous indicated input value in the sequence of indicated inputs values.

15. The method of claim 10, wherein the first response curve is a falling response curve and the state condition corresponding to the falling response curve is the system receiving a decreasing sequence of indicated input values, wherein the second response curve is a rising response curve and the state condition corresponding to the rising response curve is the system receiving an increasing sequence of indicated input values, and wherein determining whether the state transition has occurred when the indicated input value is received includes determining that, while receiving a sequence of indicated inputs each with successively decreasing values, the indicated input value is greater than the previous indicated input value in the sequence of indicated inputs values.

16. The method of claim 10, further comprising:

determining whether a previously generated transition response curve was used to determine the compensated input value for a most recent previous indicated input value, and determining the compensated input value in response to determining that the previously generated transition response curve was used to determine the compensated input value for the most recent previous indicated input value by using the transition response curve to determine the compensated input value when the indicated input value is within a range of input values between the origin point and the end point of the transition response curve, and using the second response curve to determine the compensated input value when the indicated input value is beyond the end point of the transition response curve.

17. The method of claim 16, wherein determining the compensated input value in response to determining that the previously generated transition response curve was used to determine the compensated input value for the most recent previous indicated input value further includes using the transition response curve to determine the compensated input value when the indicated input value is within the range of input values between the origin point and the end point of the transition response curve regardless of whether the state transition is detected while using the transition response curve, and using the first response curve to determine the compensated input value when the indicated input value is beyond the origin point of the transition response curve.

18. The method of claim 10, wherein defining the reference curve includes defining the first response curve or the second response curve as the reference curve.

19. A hysteresis compensation system comprising a controller configured to:

define a rising response curve indicating an expected system output value for each of a plurality of different input values when applied as an input to at least one actuator of a system as part of an increasing sequence of input values;

define a falling response curve indicating the expected system output value for each of the plurality of different input values when applied as input to the at least one actuator of the system as part of a decreasing sequence of input values;

receive a new indicated input value;

model a transition response curve in response to determining that the new indicated input value is a decreasing input value received after a received sequence of increasing input values, wherein the transition response curve extends from an origin point on the rising response curve to an end point on the falling response curve, wherein the origin point corresponds to a last indicated input value in the received sequence of increasing input values, wherein modelling the transition response curve includes applying a first input value as a control input to the at least one actuator of the system, wherein the first input value is less than a most recent previous input value applied to the at least one actuator, measuring an actual system output value generated by the system in response to applying the first input value as input to the at least one actuator, calculating a difference $\Delta O_p$ between the measured actual system output value and the output value on the rising response curve for the applied first input value, calculating a difference ΔO between the output value on the falling response curve for the applied first input value and the output value on the rising response curve for the applied first input value, calculating a difference $\Delta I_p$ between the applied first input value and the input value at the origin point of the transition response curve, estimating a difference ΔI between an input value at the origin point and an input value at the end point based on the calculated difference $\Delta O_p$, the calculated difference ΔO, and the calculated difference $\Delta I_p$ for the applied first input value and the measured actual system output value based on a proportional relationship defined by $$\frac{\Delta O_p}{\Delta O} = \frac{\Delta I_p}{\Delta I},$$

and modelling the transition response curve by defining additional points on the transition response curve for input values between the input value of the origin point and the input value of the end point based on the estimated difference ΔI, a determined difference ΔO for the additional point, a determined difference ΔI$_p$ for the additional point, and the defined proportional relationship;

receive a subsequent new indicated input value;

determine a compensated input value based on the subsequent new indicated input value using the modelled transition response curve when the subsequent new indicated input value is between the input value of the origin point and the input value of the end point of the transition response curve; and control an operation of the one or more actuators of the system by transmitting the determined compensated input value as the control input to the one or more actuators.

20. The hysteresis compensation system of claim 19, wherein the controller is configured to determine the compensated input value based on the subsequent new indicated input value using the modelled transition response curve by identifying a system output value corresponding to the subsequent new indicated input value on the rising response curve, identifying a system output value on the transition response curve that matches the identified system output value from the rising response curve, and defining the compensated input value as an input value corresponding to the identified system output value on the transition response curve.

* * * * *